(12) United States Patent
Beal et al.

(10) Patent No.: US 6,774,318 B2
(45) Date of Patent: Aug. 10, 2004

(54) REMOVABLE MATERIAL HOPPER ASSEMBLY AND METHOD OF USING SAME TO ELIMINATE RESIDUAL INGREDIENT MATERIAL

(75) Inventors: John Beal, Atlanta, GA (US); John Hotchkiss, Duluth, GA (US)

(73) Assignee: Process Control Corporation, Atlanta, GA (US)

( * ) Notice: Subject to any disclaimer, the term of this patent is extended or adjusted under 35 U.S.C. 154(b) by 222 days.

(21) Appl. No.: 10/074,818

(22) Filed: Feb. 13, 2002

(65) Prior Publication Data

US 2002/0113080 A1 Aug. 22, 2002

Related U.S. Application Data

(60) Provisional application No. 60/268,590, filed on Feb. 14, 2001.

(51) Int. Cl.$^7$ .................. G01G 13/06; G01G 13/18; G01G 13/24
(52) U.S. Cl. .................. 177/105; 177/108; 177/109; 177/113; 177/116; 222/561; 198/530; 198/532; 198/860.1
(58) Field of Search ................ 198/530–532, 198/540, 545, 548, 550.01, 550.1, 550.6, 671, 860.1, 860.4; 222/148, 413, 561, 55; 177/105–113, 116; 414/326, 519, 520, 526

(56) References Cited

U.S. PATENT DOCUMENTS

| | | | | |
|---|---|---|---|---|
| 2,161,190 A | * | 6/1939 | Pauli | 222/252 |
| 4,275,808 A | * | 6/1981 | Bullivant et al. | 198/533 |
| 4,354,622 A | * | 10/1982 | Wood | 222/55 |
| 4,876,043 A | * | 10/1989 | Hall, Sr. | 264/39 |
| 5,143,166 A | * | 9/1992 | Hough | 177/128 |
| 5,379,923 A | * | 1/1995 | Sagastegui et al. | 222/181.2 |
| 5,780,779 A | * | 7/1998 | Kitamura et al. | 177/105 |
| 6,057,514 A | * | 5/2000 | Maguire | 177/105 |
| 6,111,206 A | * | 8/2000 | Maguire | 177/60 |
| 6,568,567 B2 | * | 5/2003 | McKenzie et al. | 222/181.1 |
| 6,698,624 B2 | * | 3/2004 | Squires et al. | 222/153.14 |
| 2002/0145013 A1 | * | 10/2002 | Chrisman et al. | |

* cited by examiner

Primary Examiner—Randy W. Gibson
(74) Attorney, Agent, or Firm—Todd Deveau; Thomas, Kayden, Horstemeyer & Risley LLP

(57) ABSTRACT

A removable material hopper assembly for gravimetric batch blenders including a hopper, a metering assembly and a releasable securing assembly. The hopper is removable from the blender, and includes a metering slide gate that can be used to tightly seal off the bottom of the hopper during the removable operation. The releasable securing assembly incorporates a tongue and groove subassembly and a pin and bracket subassembly to properly align and secure the hopper to the blender during operation, but also enables easy removal of the hopper when necessary.

25 Claims, 15 Drawing Sheets

REMOVABLE MATERIAL HOPPER ASSEMBLY AND METHOD OF USING SAME TO ELIMINATE RESIDUAL INGREDIENT MATERIAL

RELATED U.S. APPLICATION DATA

This application claims priority from U.S. Provisional Application No. 60/268,590 filed Feb. 14, 2001, incorporated herein by reference.

BACKGROUND OF THE INVENTION

1. Field of the Invention

The present invention relates generally to a process and machinery for the plastics extrusion industry, particularly to a removable material hopper assembly for gravimetric blenders, and more particularly for gravimetric batch blenders. The hopper assembly is capable of releasably securing the hopper to a blender, the hopper for storing at least one particulate ingredient and delivering that particulate ingredient with high-precision metering for the blender to, for example, an extruder. A method of using the removable hopper assembly is also disclosed, during which no residual ingredient material is left on the blender after hopper removal.

2. Description of Related Art

Conventional blending devices blend various types of solid particulate ingredients, such as plastic pellets. These devices typically include a number of ingredient hoppers, each of which discharges ingredients into individual metering units. These metering units typically include a metering auger, the rotational speed of which can be varied to control the flow rate of the individual ingredients. The metering units typically discharge, or feed, individual ingredients into some sort of common hopper at independently controllable feed rates which can be varied to produce and control the desired blend of individual ingredients. A metering unit, particularly of a batch blender, may also consist of a gate mechanism, the opening time of which can be varied to control the amount of material fed of an individual ingredients.

One disadvantage of blenders, and in particular conventional batch blenders is difficulty in cleaning. Thorough cleaning of the hoppers is normally required to avoid contamination when changing ingredients, particularly when changing feed material having a different color than what was once held in the hopper. To simplify cleanout of the hoppers and related parts of the blender, it is desirable to removably mount the hoppers so that they may be individually removed. To avoid spillage, each removable hopper should have a shut-off mechanism in the neck of the removable hopper to cut off the ingredient flow through the neck when, and after, the hopper is being removed.

Even without unintended spillage, the removable hopper should limit, and preferably eliminate, residual material being left over from the hopper removal process. Although not technically spilled out from the hopper during removal, material that remains behind on the blender below the shut-off mechanism in the neck of the hopper must nonetheless be separately cleaned away before hopper return.

One attempt at a removable hopper design is disclosed in U.S. Pat. No. 6,057,514 to Maguire. This patent is directed to a gravimetric weigh scale blender with a hopper slidably supported on a frame. The hopper is removably mounted on the frame and horizontally slidably movable with the frame between a first and a second position. The hopper includes a discharge opening located substantially over a weigh pan when the hopper is at the first position.

A metering means, not attached to the hopper, comprising a pneumatic piston-cylinder actuated slide gate combination selectively releases material from the hopper into a mix chamber. A separate shoe is provided that is movable with respect to the hopper. The shoe is orientated above the metering means such that the shoe and slide gate are separated by a distance. The shoe comprises a valve opening in registry with the discharge opening in an open-valve condition, and out of registry with the discharge opening in a closed-valve condition. The shoe presents this valve between the hopper discharge opening and the mix chamber, wherein the shoe is removable with the hopper from the frame.

The blender further comprises a means for mounting the shoe on the hopper for displacement between the open-valve condition and the closed-valve condition, and an operator engaging the shoe for effecting such displacement. The operator is a saddle on the frame abutting the shoe for effecting shoe displacement relative to the hopper when the hopper is moved horizontally with respect to the frame. The saddle is responsive to a horizontal slidable movement of the hopper to position the shoe in the open-valve position when the hopper is at the first position operably mounted on the hopper frame, and to displace the shoe to the closed-valve position when the hopper is slidably moved toward the second position and removed from the hopper frame.

Prior to the Maguire device, it was known to put a valve at the bottom of a hopper to control the amount of material being fed to the blender's metering means. It also was known to provide removable hoppers with slide gates, and it was known to use a shoe to prevent hopper material spill. More specifically, it was known to place a hopper on a sliding track for removal and to make the shoe on the bottom of the hopper close the bottom of the hopper and removable with the hopper.

What Maguire appears to have provided to the art is a removable hopper design incorporating a sliding gate and a separate removable shoe, wherein the removable shoe has a specific geometry limited to a bottom plate coplanar with the discharge opening of the hopper, the shoe further having upstanding vertical and inclined side flanges slidably engaging vertical and inclined side walls of the hopper, wherein a saddle on the frame is operable to displace the shoe in the plane of the discharge opening in a path parallel to parallel sides of the opening.

Thus, while the Maguire device provides a removable hopper, such removability is at the price of complexity of parts and difficulty in practice. The shoe and hopper are slidably movable in only a very unforgiving and limited way, laterally through the use of a pin residing in a longitudinal slot of the shoe to control the relative position of the shoe when the hopper is movable between hopper open and hopper closed positions.

Further, the Maguire device provides only a limited solution to the problems of hopper cleanout procedures. Although the Maguire hopper is removable, ingredient material remains on top of the slide gate as the shoe and slide gate are separated by a distance. This material remaining between the shoe and slide gate must be manually cleaned upon hopper separation.

In view of the above, it is apparent that there exists a need to provide a simplified assembly enabling removability of a hopper from a frame. Additionally, such a removable hopper should limit or eliminate the residual material that remains after the prior art material hopper is removed from the frame. It is to the provision of such a removable hopper assembly that the present invention is primarily directed.

SUMMARY OF THE INVENTION

Briefly described, in a preferred form, the present invention is an improvement over the conventional hopper/blender unit by providing a removable assembly enabling removability of the hopper from the blender. The removable assembly comprises a sealing device to seal off the neck of the hopper during hopper removal from the blender. The same sealing device is also the metering control, regulating material flow rate from the hopper.

As a unit, the invention provides an ingredient hopper that is removable from a blender, wherein the hopper has a metering slide gate that can be used to tightly seal off the bottom of the hopper during the removable operation. The present removable material hopper assembly includes the hopper, a metering assembly and a releasable securing assembly. The metering assembly comprises a metering gate locking pin, the metering slide gate and a metering cylinder. In effect, the metering slide gate both regulates material flow rate from the hopper, and ensures that no residual material will remain on the blender during hopper separation. The metering slide gate slidingly moves along metering gate support guides by the metering cylinder. The metering slide gate can be locked against movement by the metering gate locking pin.

Further, a releasable securing assembly is provided that simplifies removability through the use of a quick release pin and retaining brackets on the top plate of the blender. The releasable securing assembly further comprises a tongue and locking groove subassembly that cooperate to align and lock the hopper on the top plate. The quick release pin can be slidably engagable through the bottom portion of removable hopper and corresponding retaining brackets. The tongue extends from the bottom portion of the hopper and is slidably engagable within a corresponding locking groove of a divider plate of the top plate. Such a design is distinguished from the prior art in that present blenders with removable hoppers include a sealing element and a shoe, both elements separate from the hopper and the blender.

The present invention's novel use of the metering gate as the shut-off valve during hopper removal necessarily eliminates the prior art disadvantage of residual hopper material being left on top of the metering gate, which residual material must be cleaned before the hopper can be placed once again on the frame. If the residual material is not separately cleaned away, the residual material will be left to mix with any new and different ingredient placed in the hopper.

Further, the novel releasable securing assembly makes hopper removal quick and easy.

Thus, an object of the invention is to provide an improved hopper/blender assembly. Another object of the present invention is to provide an improved removable hopper that is easy to lock and unlock into operational position. Yet another object of the present invention is the provision of a method of hopper removal that eliminates residual material left upon hopper separation. These and other objects, features, and advantages of the present invention will be more apparent upon reading the following specification in conjunction with the accompanying drawings.

DETAILED DESCRIPTION OF PREFERRED EMBODIMENTS

Figure 1:
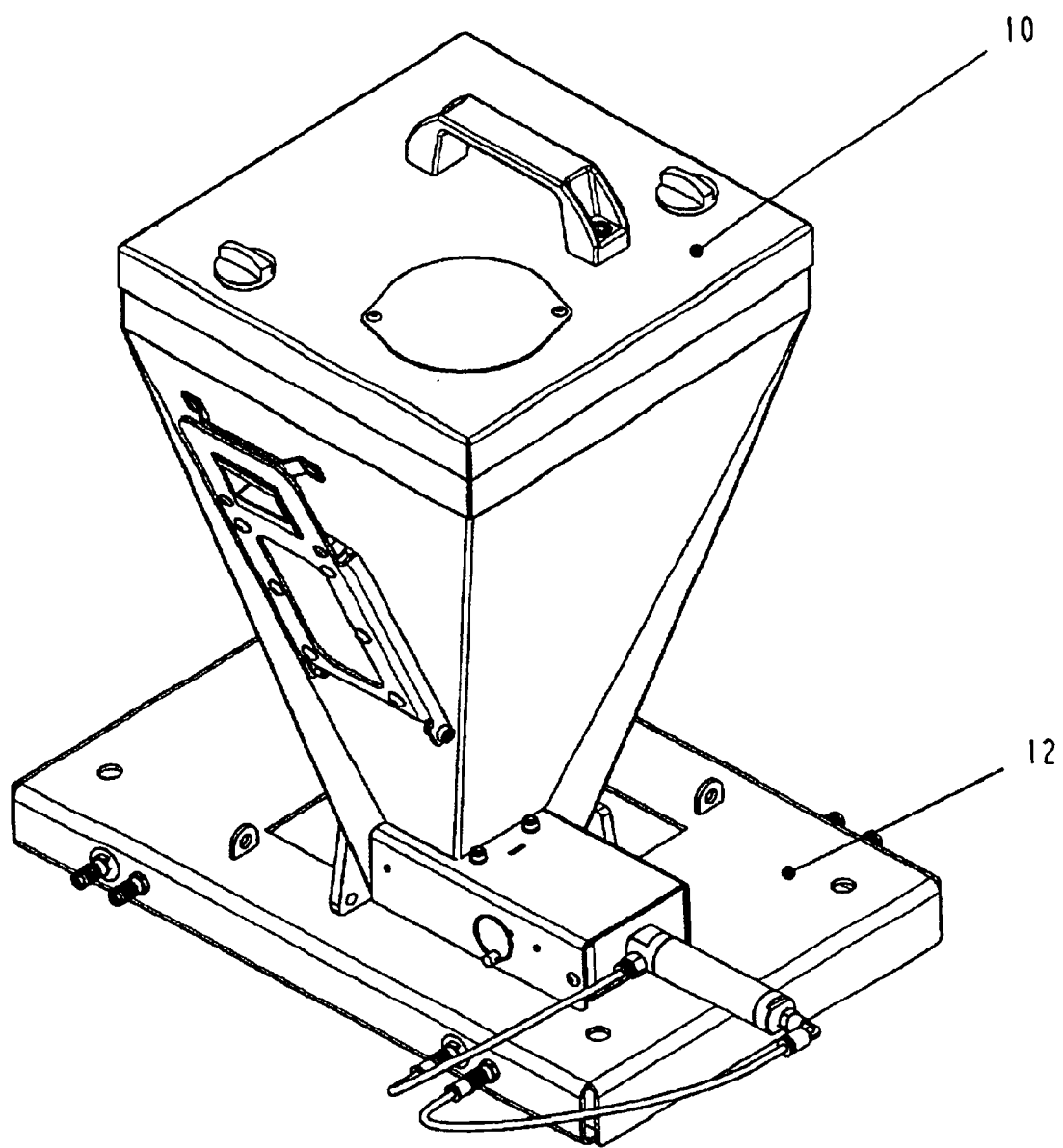
FIG. 1 is a perspective view of a removable hopper mounted upon a blender top plate according to a preferred embodiment of the present invention.
Figure 2:
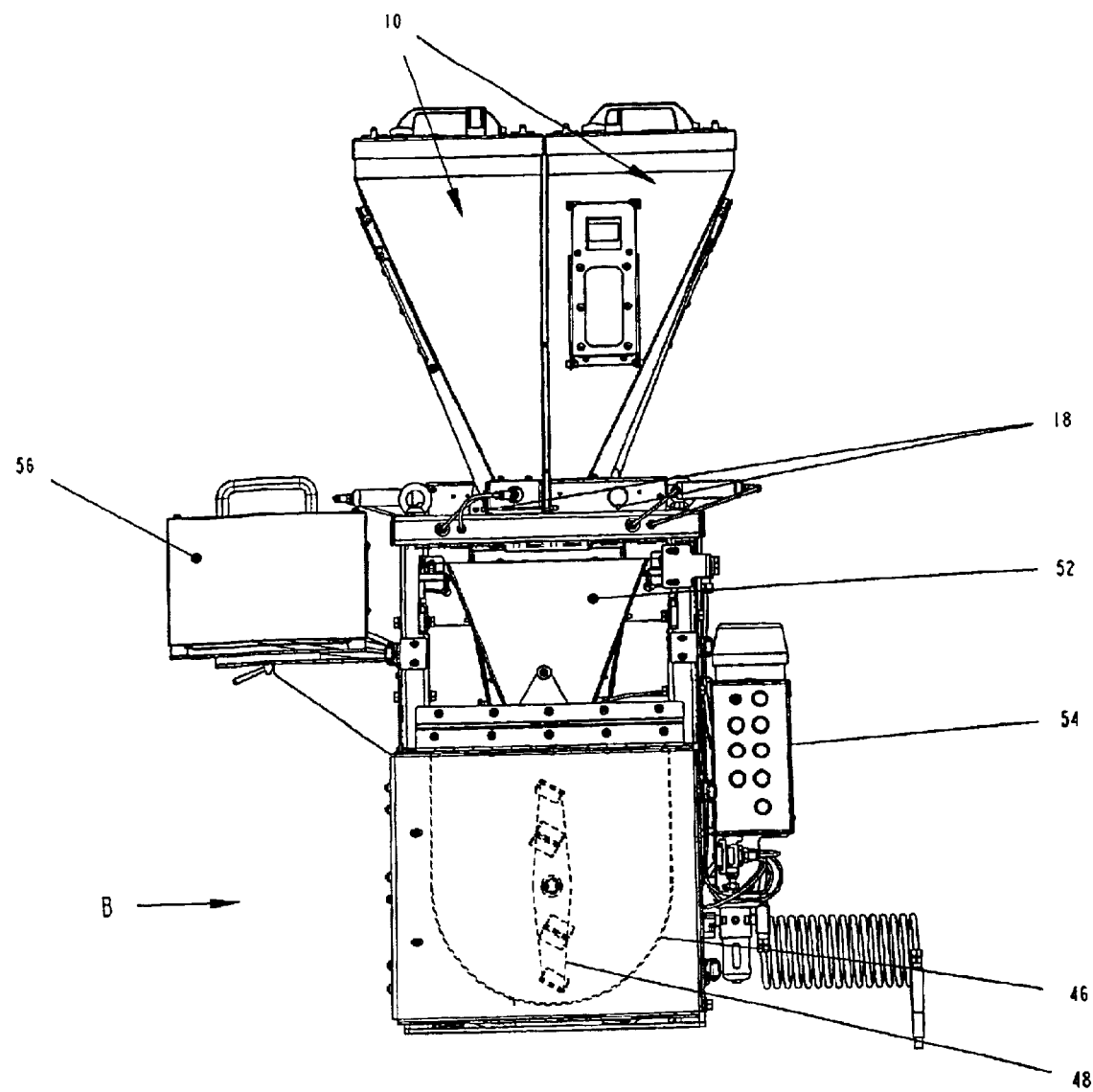
FIG. 2 is a front elevation of a blender having mounted thereupon a plurality of releasable hoppers as that shown in FIG. 1 of the present invention.

Referring now in detail to the figures, wherein like reference numerals represent like parts throughout the several views, FIG. 1 shows the present removable hopper 10 securely mounted on a top plate 12 of blender B shown generally in FIG. 2. Blender B can be a gravimetric blender used by the plastics industry. A conventional gravimetric blender is designed to meter one or more material ingredients (typically in the form of resin pellets) from one or more removable ingredient hoppers 10 in controlled ratios by weight (i.e., gravimetrically), and to deliver these ingredients to a chamber 46, typically a mixing chamber where multiple material ingredients are being metered. The ingredients are then available from the mixing chamber 46 to a material processing machine (not shown), such as an extruder, for further processing.

Figure 13:
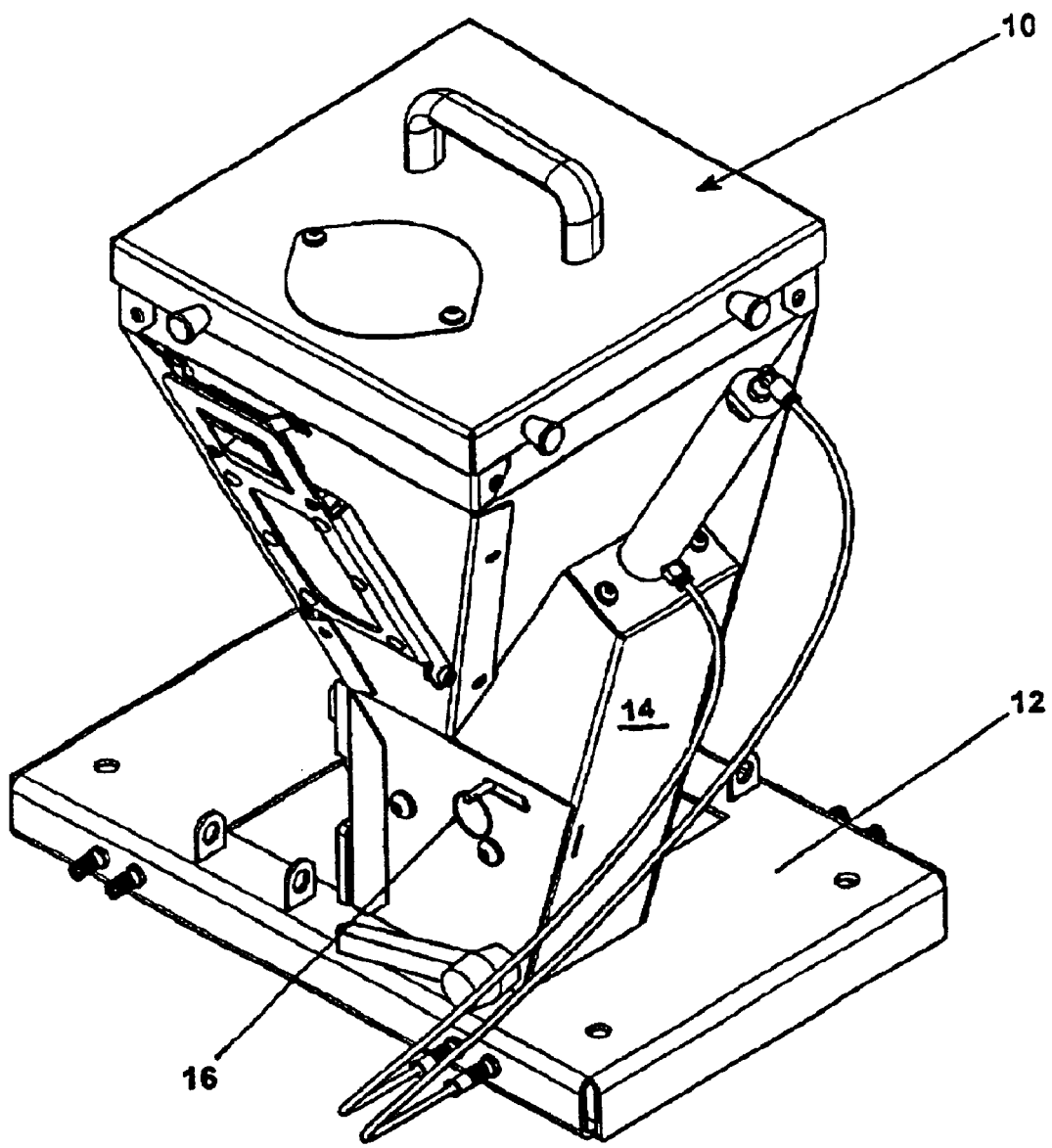
FIG. 13 is a perspective view of a removable hopper mounted upon a blender top plate according to another preferred embodiment of the present invention.
Figure 14:
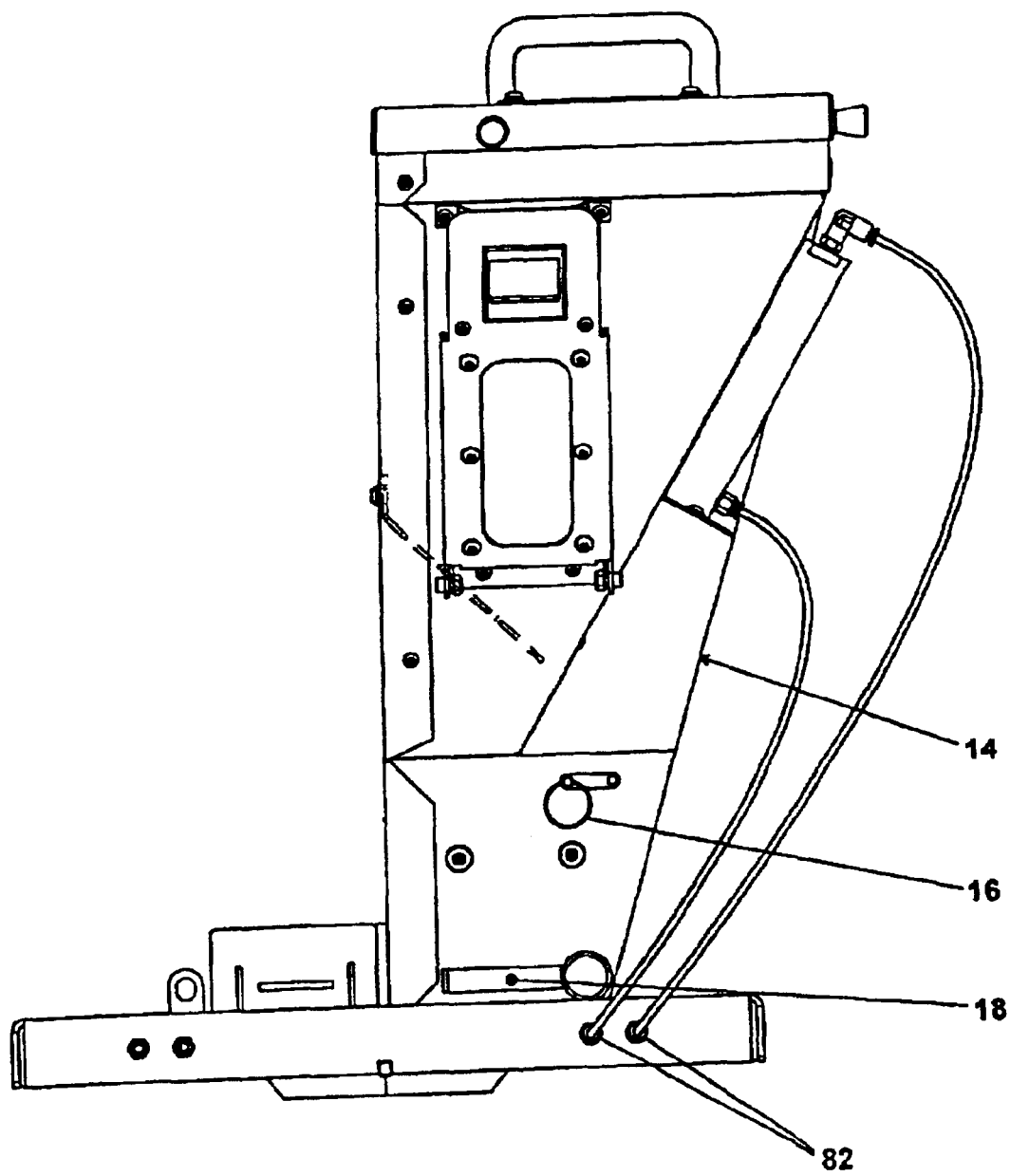
FIG. 14 is a front elevation of a blender having mounted thereupon a plurality of releasable hoppers as that shown in FIG. 13 of the present invention.
Figure 15:
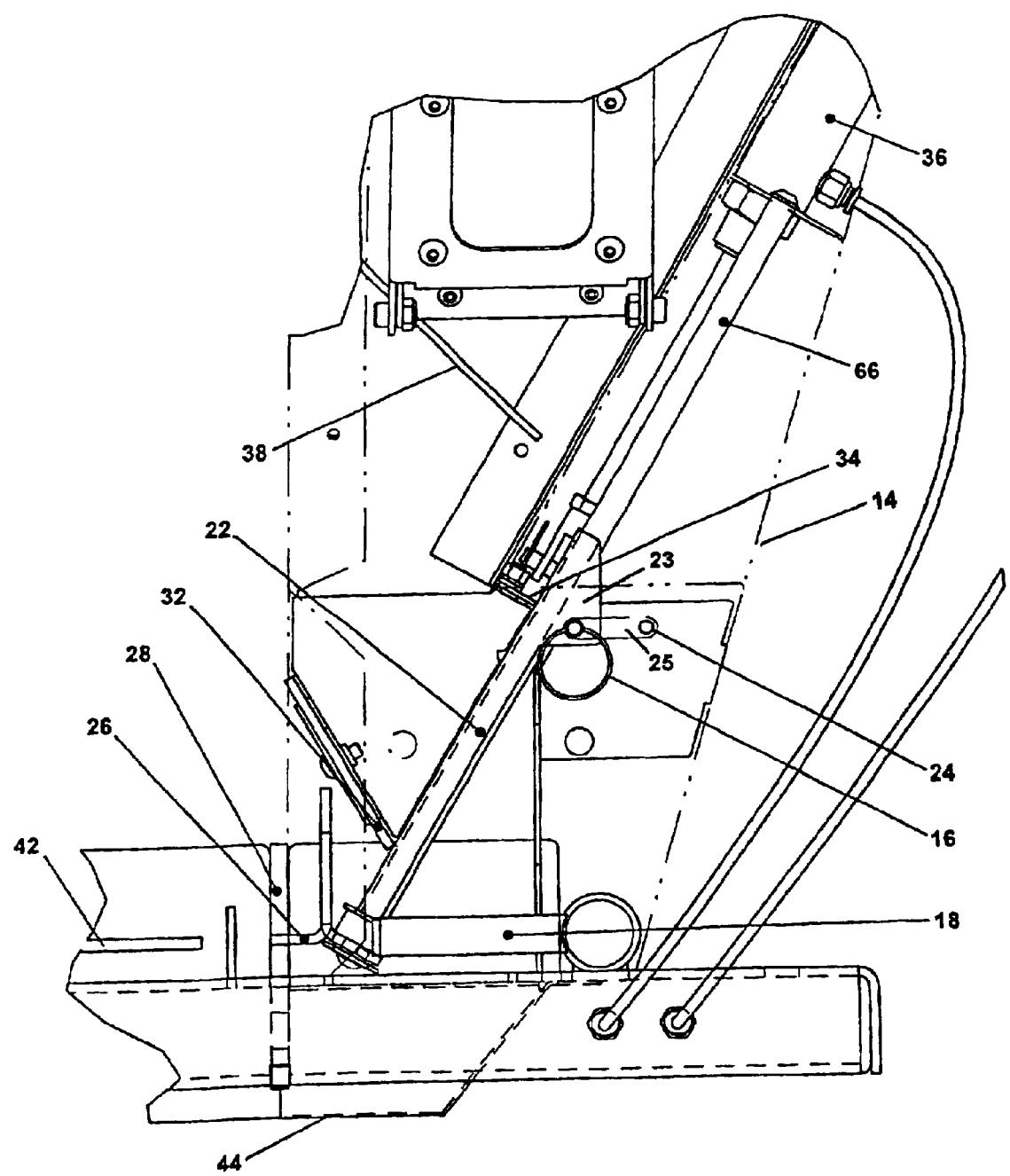
FIG. 15 is a cross-sectional enlarged view of a front elevation of FIG. 13 illustrating the metering gate of the removable hopper of FIG. 13.

The figures generally fall into two sets of similar figures, as such, detailed description of the present invention will include specific reference to a first set of drawings, although specific differences between the two sets will be expressly noted. A first set of drawings, FIGS. 1–6, show a first embodiment of the present invention utilizing a horizontally positioned slide. A second set of drawings, FIGS. 7–12, show a second embodiment of the present invention utilizing a horizontally positioned slide, and a blender having a fixed hopper. FIGS. 13–15 illustrate yet another embodiment of the present invention utilizing a vertically positioned slide.

It will be understood that the figures are representative of the present removable hopper assembly, and the invention is not so limited to the model type or number of hoppers used in conjunction with a particular blender. It will be further understood that unless specifically described otherwise, references to elements of a figure of the first set is applicable to similar elements of the corresponding figure of the second set of drawings—references to FIG. 1 (first set) generally relate to references of FIG. 7 (second set), references to FIG. 2 (first set) generally relate to references of FIG. 8 (second set), and so on.

Figure 8:
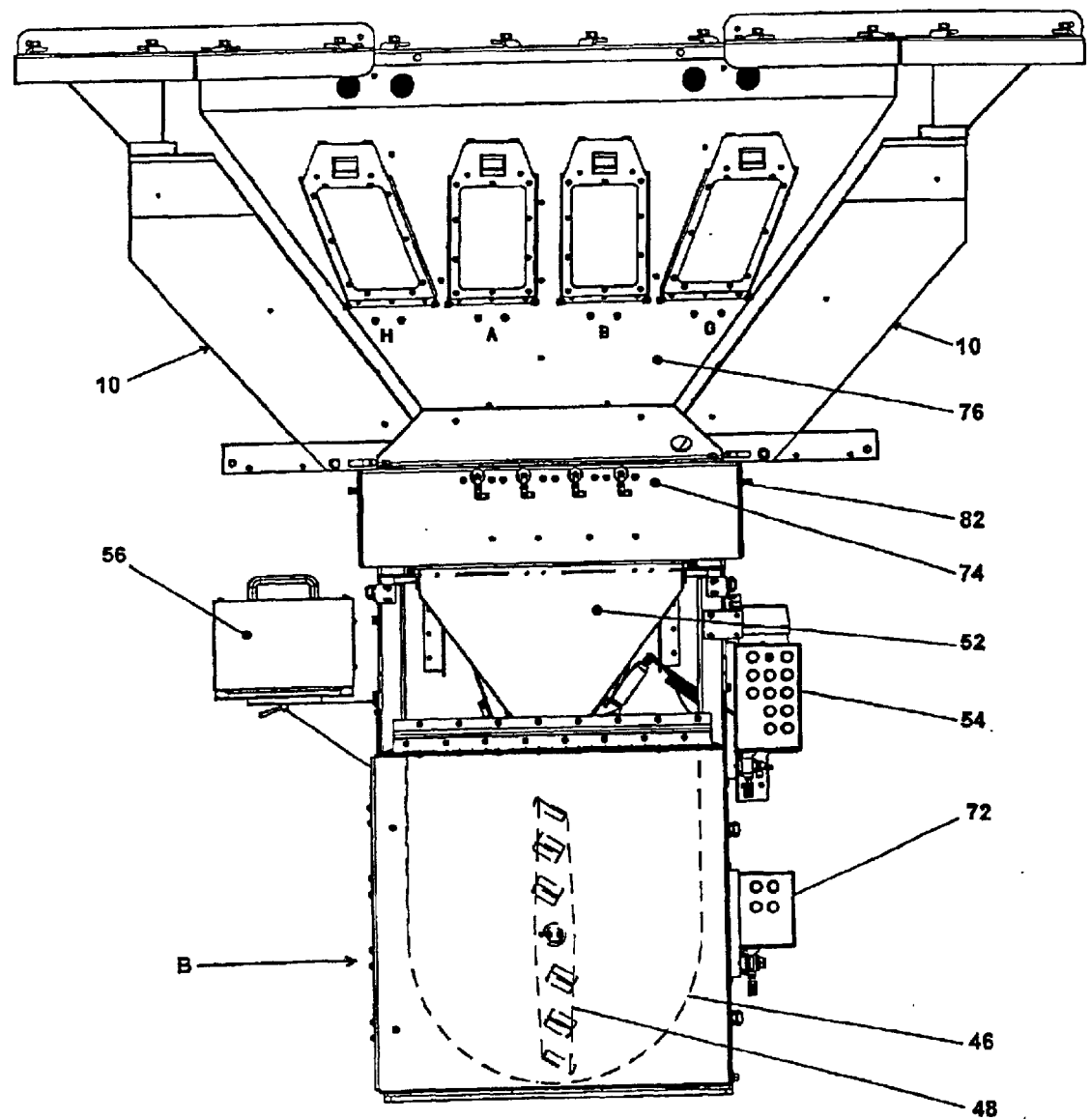
FIG. 8 is a front elevation of a blender having mounted thereupon a plurality of releasable hoppers as that shown in FIG. 7 of the present invention.
Figure 9:
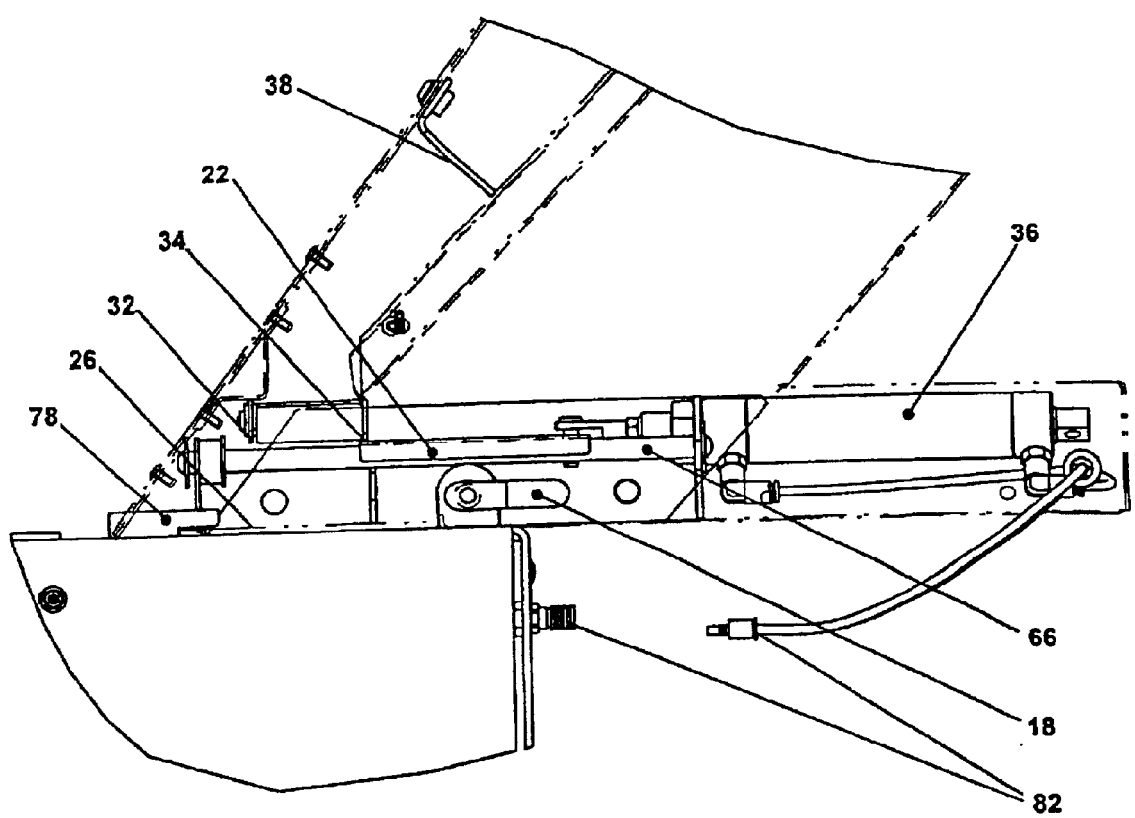
FIG. 9 is a cross-sectional enlarged view of a front elevation of FIG. 7 illustrating the metering gate of the removable hopper of FIG. 7.
Figure 10:
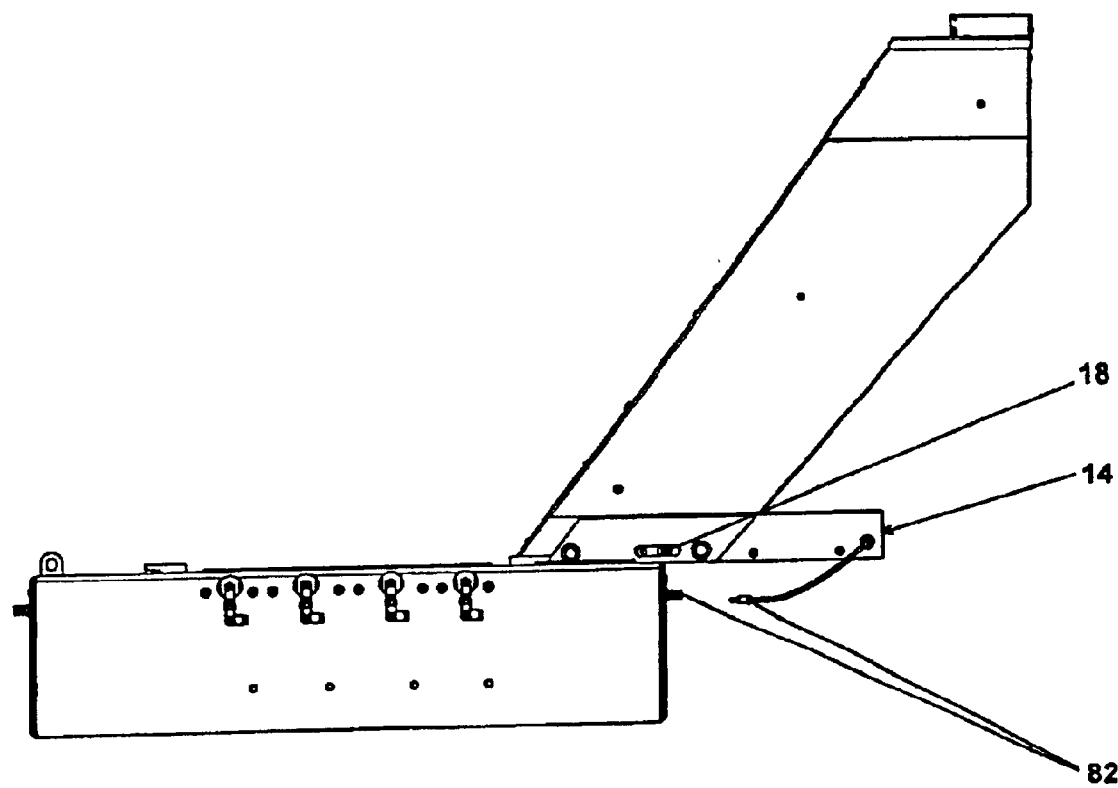
FIG. 10 is a front elevation of FIG. 7.

The present invention comprises a removable material hopper assembly that enables easy removal of the removable ingredient hopper 10 from the top plate 12. The removable hoppers 10 can be combined in machines also including fixed hoppers. For example, FIG. 8 illustrates a fixed hopper 76 flanked by removable hoppers 10. The present removable hopper assembly includes a hopper 10, a metering assembly 14 and a releasable securing assembly 100. The hopper 10 can be a storage bin having at its bottom an open neck, or material passageway 44 (FIG. 3), through which material ingredients stored in the hopper 10 can exit the hopper 10.

Figure 3:
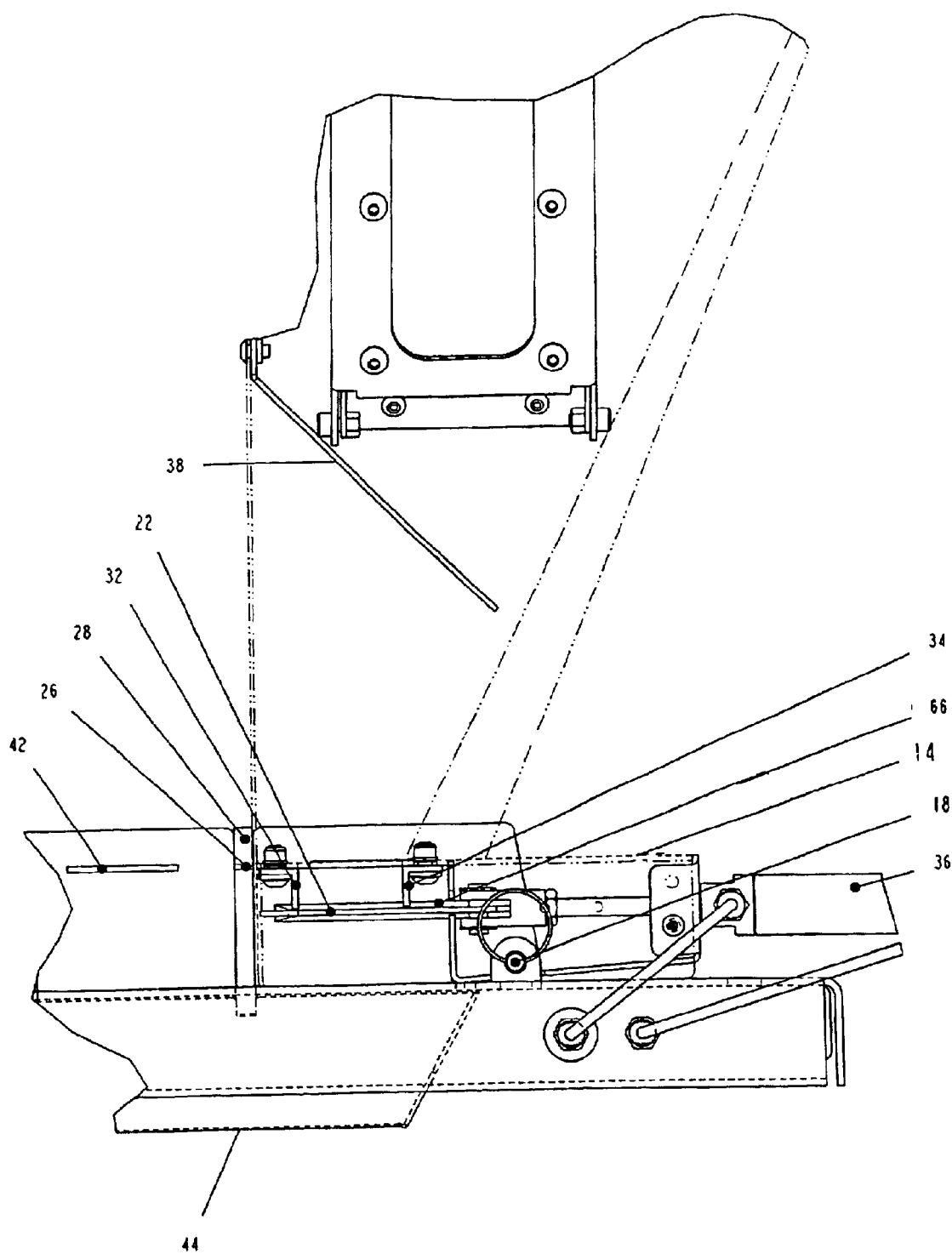
FIG. 3 is a cross-sectional enlarged view of a front elevation of FIG. 1 illustrating the metering gate of the removable hopper of FIG. 1.
Figure 4:
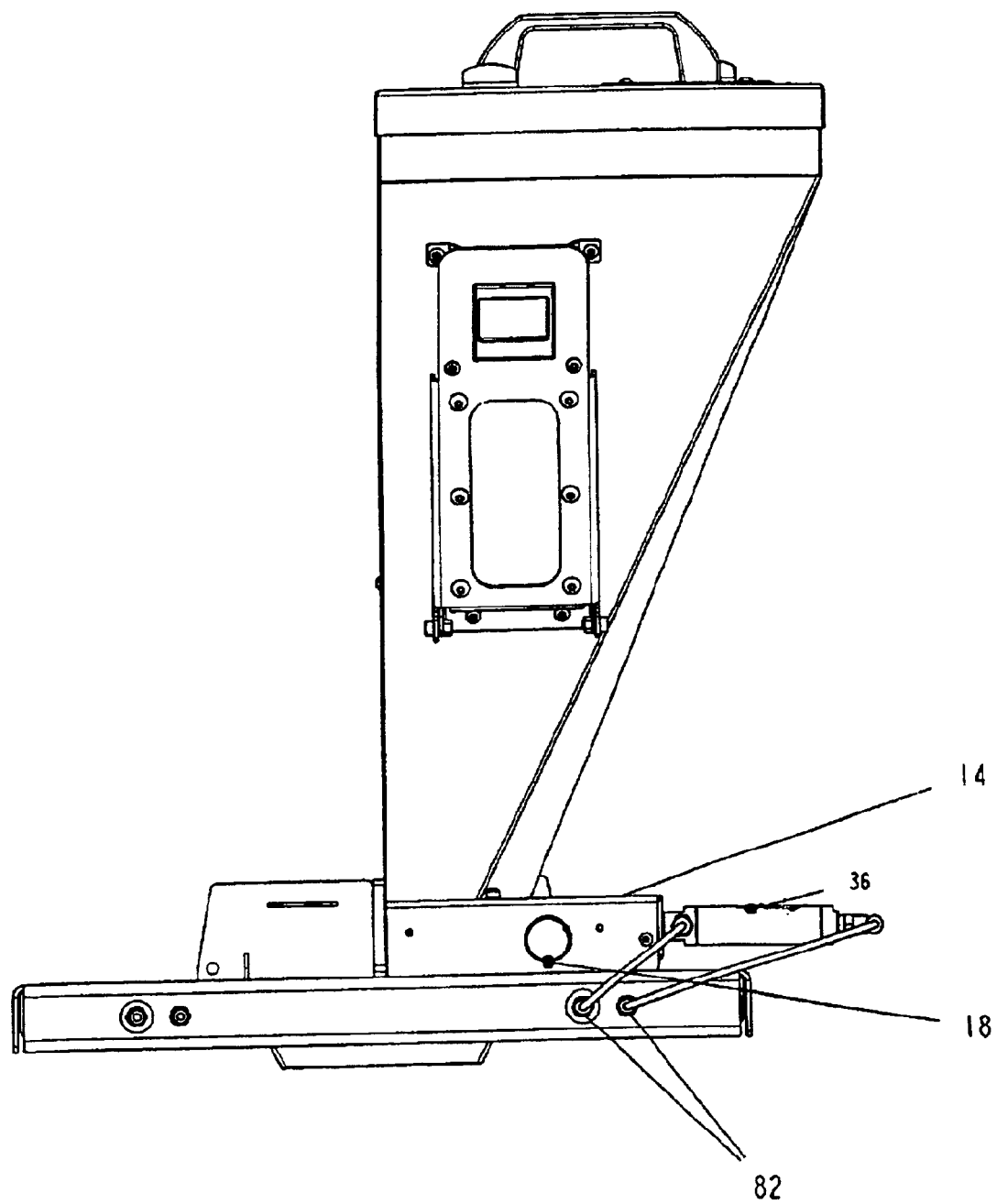
FIG. 4 is a front elevation of FIG. 1.

As shown in FIGS. 3 and 4, the metering assembly 14 generally comprises a metering slide gate 22 and a metering cylinder 36. The metering slide gate 22 can be operably aligned utilizing metering gate support guides 66, slidingly movable by the retraction and extension of the metering cylinder 36. The metering cylinder 36 can be an air cylinder. In the embodiment of FIGS. 13–15, the metering assembly 14 can further comprise metering gate locking pin 16.

The slide gate 22 can be retracted by the metering cylinder 36, opening the bottom of the material hopper 10, including material passageway 44, and enabling material ingredients in the hopper 10 to dispense, for example, into a weigh chamber 52 below (FIG. 2). Guides 66 can provide alignment and support for the slide gate 22. To seal off the hopper 10, the slide gate 22 can be extended by the metering cylinder 36 until the slide gate 22 closes against a front seal 32. Material can be kept from dropping out of the back of the metering assembly 14 by a rear seal 34.

If metering slide gate 22 is inclined off the horizontal (FIGS. 13–15), the metering assembly 14 can further comprise metering gate locking pin 16. The metering slide gate 22 can be restrained from intended or accidental movement by the metering gate locking pin 16. As shown specifically in FIG. 15, slide gate 22 includes a locking portion 23. The locking portion 23 of slide gate 22 incorporates a hole therethrough that corresponds to the dimensions of the locking pin 16. With the locking pin 16 stored in a metering gate locking pin storage hole 24, the slide gate can be unrestrained from movement along guides 66. When the slide gate 22 is in a closed position, wherein the material passageway is effectively closed to falling material by the compressive communication of the slide gate 22 with the front seal 32, the locking portion 23 of the slide gate 22 is positioned such that the locking pin 16 can extended through the locking portion 23 of the slide gate 22 and restrain movement of the slide gate 22. For example, the hopper 10 is shown with a restraining slot 25 that restrains the locking pin 16 and slide gate 22 from relative motion. Although metering gate locking pin 16 and associated elements can be utilized with a metering slide gate 22 inclined off the horizontal, these elements may also be incorporated with hopper assemblies having a horizontally positioned gate 22.

Figure 5:
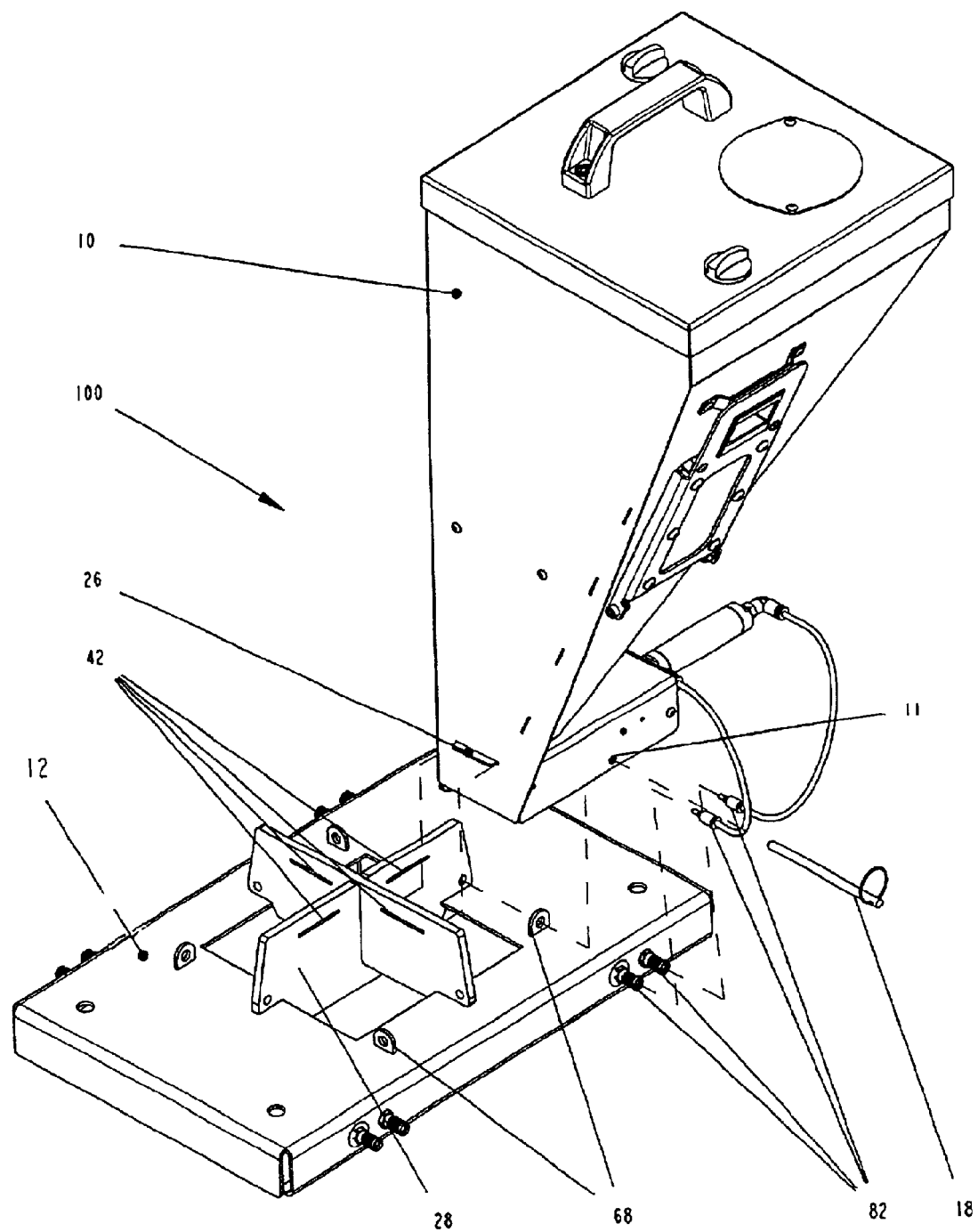
FIG. 5 is a perspective, exploded view of the removable hopper and blender top plate of FIG. 1.
Figure 6:
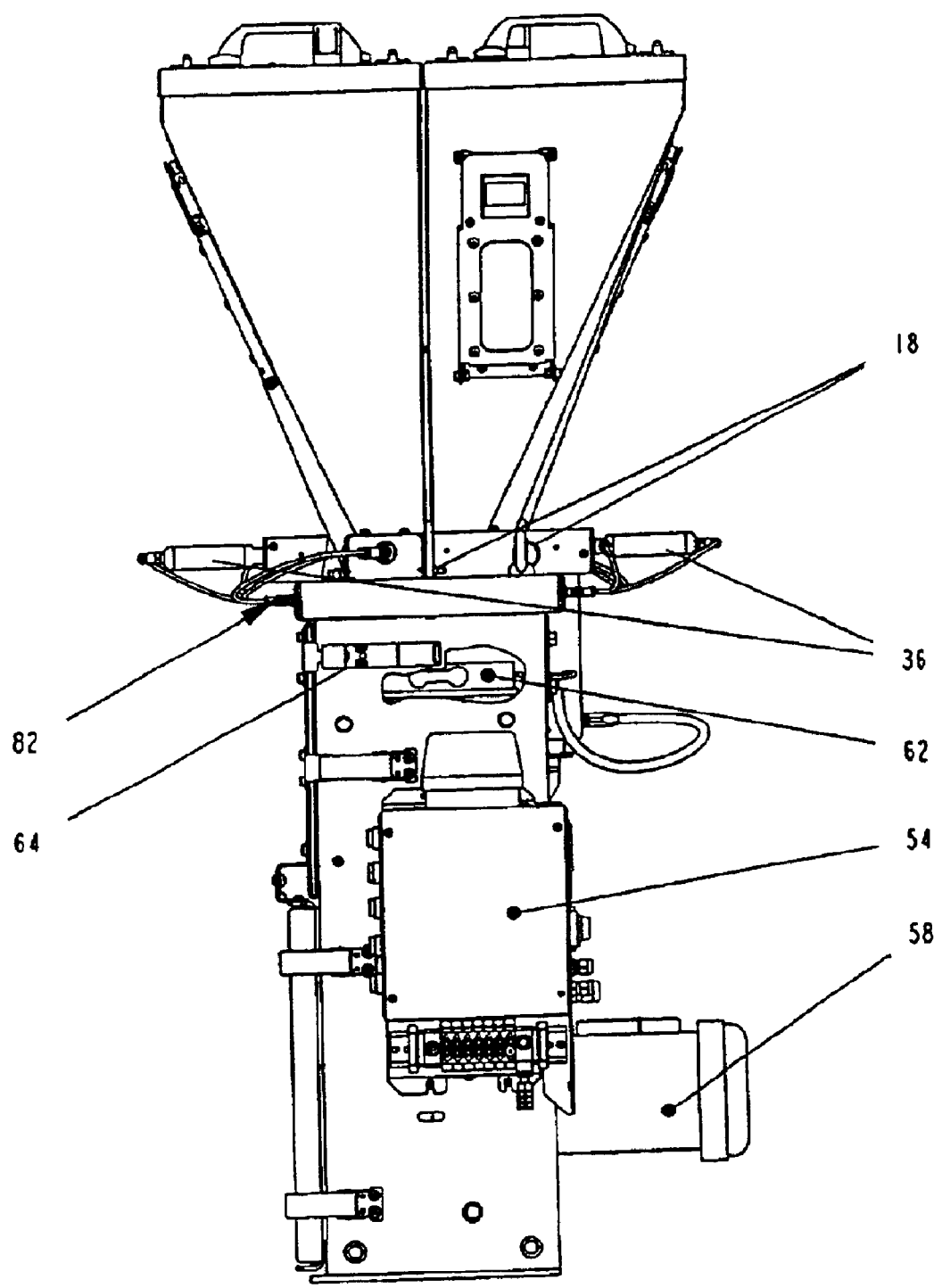
FIG. 6 is a side view of FIG. 2.
Figure 7:
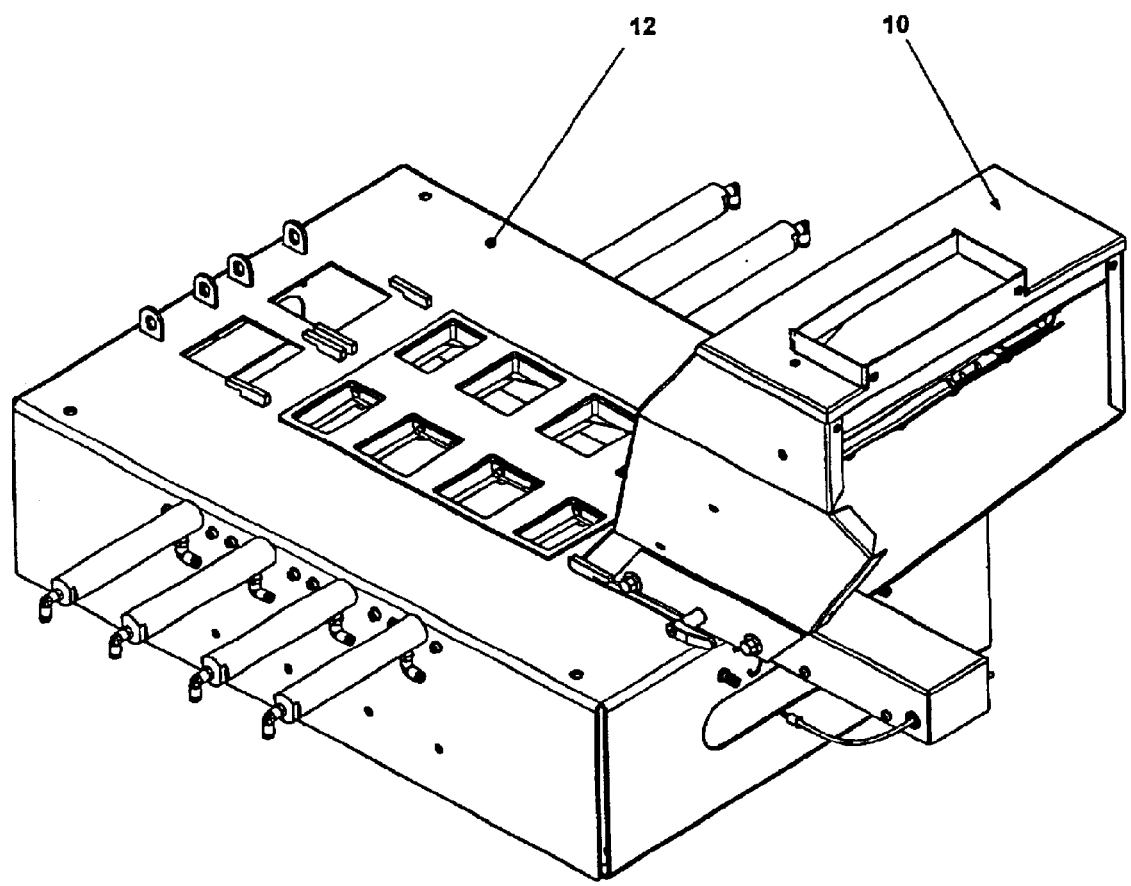
FIG. 7 is a perspective view of a removable hopper mounted upon a blender top plate according to another preferred embodiment of the present invention.

The present removable hopper assembly farther comprises a releasable securing assembly 100, which when working in relationship with the metering assembly 14, enables the hopper 10 to be removed from the top plate 12 leaving minimal or no residual material requiring separate clean up. As shown in FIG. 5, the releasable securing assembly 100 can comprise a quick release pin 18, hopper tongue 26, divider plate 28, locking grooves 42 and retaining brackets 68. It will be understood that a combination of less than all of these elements, or all of these elements, may be used to releasably secure the hopper 10 from the blender B. In another embodiment, FIG. 11 illustrates a releasable securing assembly 110 comprising the quick release pin 18, hopper tongue 26, locking tangs 78 (in place of the divider plate 28 and locking grooves 42 of releasable securing assembly 100), and retaining brackets 68.

Returning to FIG. 5, quick release pin 18 can be slidably engagable through both an aperture 11 in the bottom portion of removable hopper 10 and corresponding retaining brackets 68 when the hopper 10 is properly resting upon top plate 12. Hopper tongue 26 extends from the bottom portion of the hopper 10 and is slidably engagable within a corresponding locking groove 42 in the divider plate 28. When the removable hopper 10 is securely mounted to the top plate 12, the quick release pin 18 provides a first securing subassembly with the hopper 10 (via the hopper aperture 11) and the top plate 12 (via the retaining brackets 68) The tongue 26 provides a second securing subassembly with the hopper 10 and the divider plate 28 (via locking groove 42).

Figure 11:
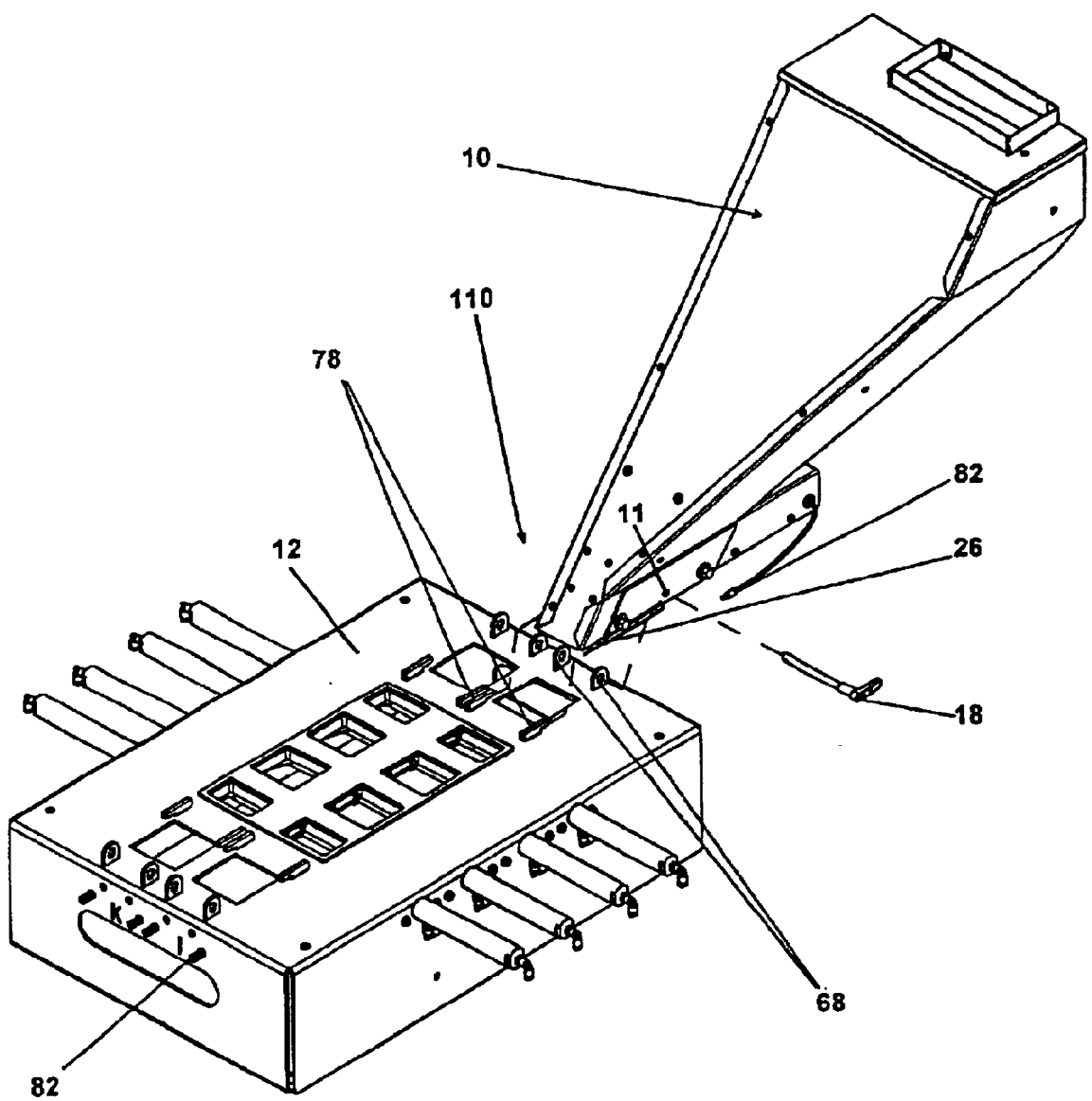
FIG. 11 is a perspective, exploded view of the removable hopper and blender top plate of FIG. 7.
Figure 12:
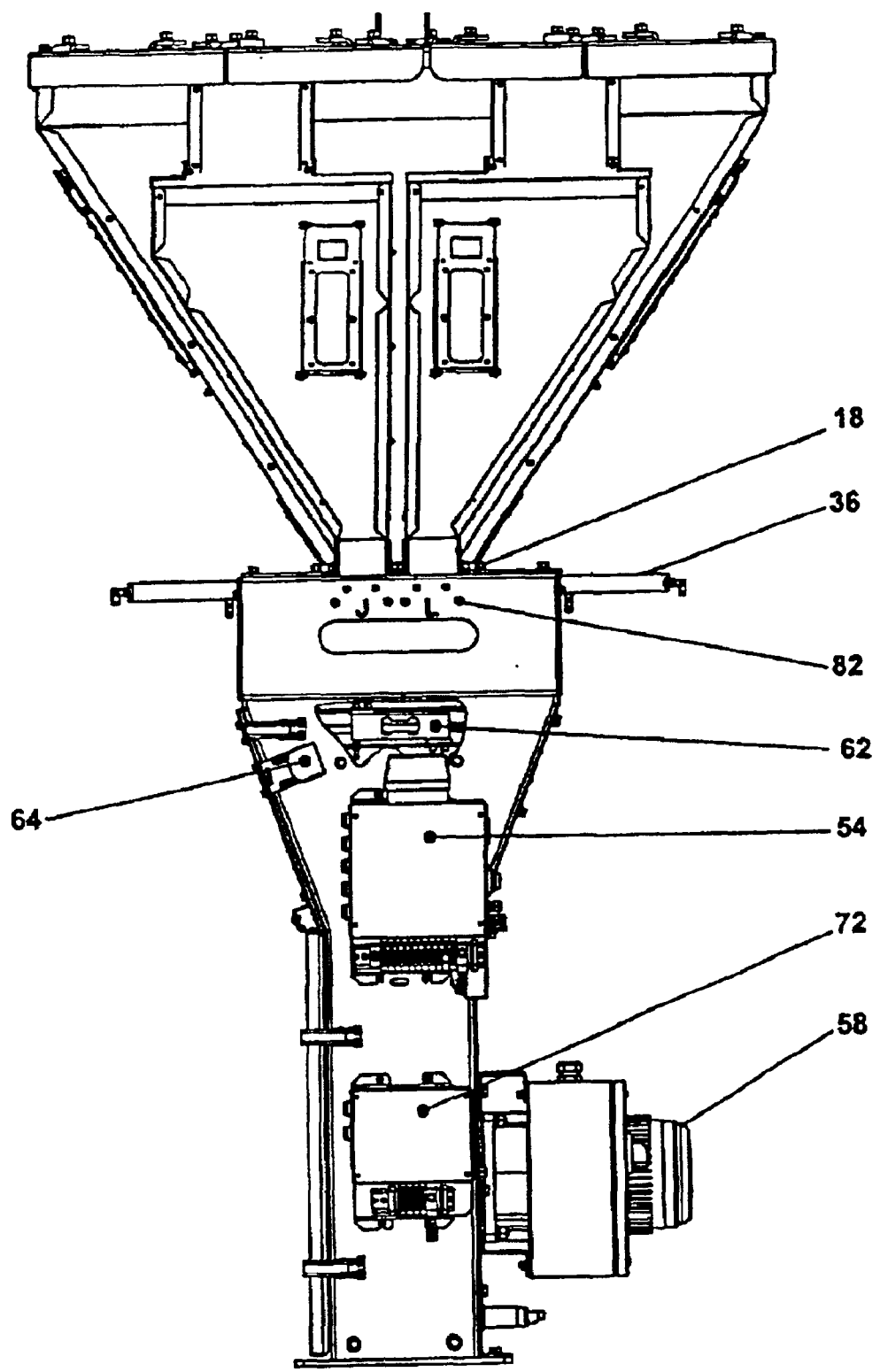
FIG. 12 is a side view of FIG. 8.

As shown in FIG. 11, quick release pin 18 can be slidably engagable through both the aperture 11 in the bottom portion of removable hopper 10 and corresponding retaining brackets 68 when the hopper 10 is properly resting upon top plate 12. Hopper tongue 26 extends from the bottom portion of the hopper 10 and can be slidably engagable within a corresponding locking tang 78 extending from the top plate 12. When the removable hopper 10 is securely mounted to the top plate 12, the quick release pin 18 provides a first securing subassembly with the hopper 10 (via the hopper aperture 11) and the top plate 12 (via the retaining brackets 68) The tongue 26 provides a second securing subassembly with the hopper 10 and the top plate 12 (via locking tang 78).

In operation, the removable hopper 10 can be released from the top plate 12 by first pulling the quick release pin 18 out of the retaining brackets 68 and the hopper aperture 11, and then sliding the tongue 26 out of the locking groove 42 in the divider plate 28. The hopper 10 then can be lifted free from the top plate 12. To replace the hopper 10, the hopper 10 is placed over the retaining brackets 68, slid forward until the tongue 26 slides into the locking groove 42 of the divider plate 28, and then the quick release pin 18 is placed through the aperture 11 in the hopper 10 that lines up with the retaining brackets 68. Other than the slight maneuvering by tilting or the like that may be necessary to slide the tongue 26 out of the locking groove 42 in the divider plate 28 (FIG. 5), or to slide the tongue 26 out of the locking tang 78 extending from the top plate 12 (FIG. 11), the present assembly enables the hopper to be simply and easily raised up vertically in place—there is no horizontal shifting of the hopper prior to lifting it off the blender.

The present invention does not incorporate a shoe element as required in prior art devices. As previously discussed, the Maguire device utilizes both a slide gate and shoe, wherein the slide gate remains with the blender upon hopper removal, and wherein there is space between the slide gate and the shoe. When the hopper and shoe are removed from the blender, residual material will remain behind, and sit on top of the slide gate, which residual material was located in the space between the shoe and slide gate before hopper removal. This amount of material must be cleaned out with the hopper removed, and only then can the new hopper be placed on the blender.

Unlike Maguire, since the slide gate 22 of the present invention is the hopper sealing mechanism, and is removed along with the hopper 10, there remains no residual material that must be cleaned out before the hopper can be replaced on the blender.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. In a unit including (i) a material hopper having a neck, and (ii) equipment to which the material hopper dispenses material through the neck, an improvement to the unit comprising a removable assembly enabling removability of the hopper from the equipment to which the material hopper dispenses material, the removable assembly incorporating a sealing device to seal off the neck of the hopper during hopper removal from the equipment, the sealing device also to regulate material flow from the hopper when the hopper is positioned to dispense material, the sealing device comprising a sliding mechanism designed to slide into and out of sealing arrangement with the neck of the hopper.

2. The improved unit of claim 1, the sealing device being in a horizontal orientation to seal the neck of the hopper.

3. The improved unit of claim 1, the sealing device being in an inclined orientation off the horizontal to seal the neck of the hopper.

4. The improved unit of claim 2, the sealing device being a slide gate.

5. In a unit including (i) a material hopper having a neck, and (ii) equipment to which the material hopper dispenses material through the neck, an improvement to the unit comprising a removable assembly enabling removability of the hopper from the equipment to which the material hopper dispenses material, the removable assembly incorporating a sealing device to seal off the neck of the hopper during hopper removal from the equipment, the sealing device also to regulate material flow from the hopper, the sealing device comprising a slide gate operably aligned by metering gate support guides, slidingly movable by the retraction and extension of a metering cylinder.

6. In a unit including (i) a material hopper having a neck, and (ii) equipment to which the material hopper dispenses material through the neck, an improvement to the unit comprising a removable assembly enabling removability of the hopper from the equipment to which the material hopper dispenses material, the removable assembly incorporating a sealing device to seal off the neck of the hopper during hopper removal from the equipment, the sealing device also to regulate material flow from the hopper, the removable assembly further comprising a releasable securing assembly, which along with the sealing device enables the hopper to be removed from the equipment, the releasable securing assembly comprising a tongue and a locking groove assembly between the hopper and the equipment.

7. In a unit including (i) a material hopper having a neck, and (ii) equipment to which the material hopper dispenses material through the neck, an improvement to the unit comprising a removable assembly enabling removability of the hopper from the equipment to which the material hopper dispenses material, the removable assembly incorporating a sealing device to seal off the neck of the hopper during hopper removal from the equipment, the sealing device also to regulate material flow from the hopper, the removable assembly further comprising a releasable securing assembly, which along with the sealing device enables the hopper to be removed from the equipment, the releasable securing assembly comprising a release pin and retaining bracket assembly between the hopper and the equipment, the release pin extending through the removable assembly and the retaining bracket.

8. The improved unit of claim 6, wherein the releasable securing assembly enables the hopper to be lifted off of the equipment vertically, without initially laterally sliding the hopper on the equipment to disengage the releasable securing assembly.

9. A gravimetric blender comprising:
   (a) a material hopper having a neck, and
   (b) a removable assembly enabling removability of the hopper from the blender, the removable assembly including a slide gate:
      wherein the slide gate both regulates material flow from the hopper to the blender when the hopper is positioned to disperse material, and seals off the neck of the hopper during removal from the blender.

10. A gravimetric blender comprising:
    (a) a material hopper having a neck, and
    (b) a removable assembly enabling removability of the hopper from the blender, the removable assembly including a slide gate:
       wherein the slide gate both regulates material flow from the hopper to the blender, and seals off the neck of the hopper during removal from the blender, the slide gate being slidingly movable by the retraction and extension of a metering cylinder.

11. The gravimetric blender of claim 9, the removable assembly further comprising a releasable se curing assembly, which a long with the slide gate, enables the hopper to be removed from the blender.

12. The gravimetric blender of claim 11, the releasable securing assembly comprising a tongue, and a locking groove assembly between the hopper and the blender.

13. The gravimetric blender of claim 11, the releasable securing assembly comprising a release pin and retaining bracket assembly between the hopper and the blender, the release pin extending through the removable assembly and the retaining bracket.

14. The gravimetric blender of claim 11, wherein the releasable securing assembly enables the hopper to be lifted off of the blender vertically, without initially laterally sliding the hopper relative to the blender to disengage the releasable securing assembly.

15. A method of dispensing material from a material hopper having a neck to equipment to which the material hopper dispenses material through the neck, the method comprising the following steps:
    (a) providing a metering device in the form of a sliding mechanism designed to slide into and out of sealing arrangement with the neck of the hopper;
    (b) regulating the material flow rate from the hopper to the equipment with the metering device until the hopper needs to be refilled with material;
    (c) sealing off the neck of the hopper with the metering device;
    (d) disengaging the hopper from the equipment without laterally sliding the hopper relative to the equipment;
    (e) filling the hopper with material; and
    (f) reengaging the hopper to the equipment.

16. The method according to claim 15, wherein steps (a) and (b) are accomplished with a slide gate.

17. The method according to claim 15, wherein step (c) of disengaging the hopper from the equipment is accomplished by removing a release pin from the hopper and a retaining bracket on the equipment.

18. The improved unit of claim 3, the sealing device being a slide gate.

19. The improved unit of claim 7, wherein the releasable securing assembly enables the hopper to be lifted off of the equipment vertically, without initially laterally sliding the hopper on the equipment to disengage the releasable securing assembly.

20. A gravimetric blender comprising:
  (a) a material hopper having a neck, and
  (b) a removable assembly enabling removability of the hopper from the blender, the removable assembly including a slide gate:
    wherein the slide gate both regulates material flow from the hopper to the blender, and seals off the neck of the hopper during removal from the blender;
    the removable assembly further comprising a releasable securing assembly, which along with the slide gate, enables the hopper to be removed from the blender, the releasable securing assembly comprising a tongue and locking groove assembly between the hopper and the blender.

21. A gravimetric blender comprising:
  (a) a material hopper having a neck, and
  (b) a removable assembly enabling removability of the hopper from the blender, the removable assembly including a slide gate:
    wherein the slide gate both regulates material flow from the hopper to the blender, and seals off the neck of the hopper during removal from the blender;
    the removable assembly further comprising a releasable securing assembly, which along with the slide gate, enables the hopper to be removed from the blender, the releasable securing assembly comprising a release pin and retaining bracket assembly between the hopper and the blender, the release pin extending through the removable assembly and the retaining bracket.

22. A method of dispensing material from a material hopper having a neck to equipment to which the material hopper dispenses material through the neck, the method comprising the following steps:
  (a) regulating the material flow rate from the hopper to the equipment with a metering device until the hopper needs to be refilled with material;
  (b) sealing off the neck of the hopper with the metering device;
  (c) disengaging the hopper from the equipment without laterally sliding the hopper relative to the equipment; and
  (d) reengaging the hopper to the equipment;
  wherein step (c) of disengaging the hopper from the equipment is accomplished by removing a release pin from the hopper and a retaining bracket on the equipment.

23. A hopper for receiving material and dispensing the material to an associated machine, comprising:
  a hopper container having an opening for receiving said material in an upper portion of the hopper container and a discharge opening in a lower portion of the hopper container for dispensing said material;
  a sealing device to seal off the discharge opening for removing said hopper from said machine, the sealing device also to regulate material flow from said hopper, when the hopper is positioned to dispense material;
  the sealing device comprising a sliding mechanism designed to slide into and out of sealing arrangement with the discharge opening of the hopper container.

24. The hopper of claim 23, wherein the sealing device is a slide gate.

25. The hopper of claim 24, the slide gate being operably aligned by metering gate support guides, slidingly movable by the retraction and extension of a metering cylinder.

* * * * *